(12) United States Patent
Lueschow et al.

(10) Patent No.: US 6,552,279 B1
(45) Date of Patent: Apr. 22, 2003

(54) METHOD AND APPARATUS CONFIGURED TO PERFORM VISCOSITY COMPENSATION FOR A PAYLOAD MEASUREMENT SYSTEM

(75) Inventors: Kevin J. Lueschow, Elmwood, IL (US); Dugan Um, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 103 days.

(21) Appl. No.: 09/934,825

(22) Filed: Aug. 22, 2001

(51) Int. Cl.[7] .................. G01G 19/00; G01G 23/01
(52) U.S. Cl. .................. 177/141; 73/1.13; 702/100; 702/101; 702/174
(58) Field of Search .................. 73/1.13; 177/50, 177/141; 702/100, 101, 174, 175

(56) References Cited

U.S. PATENT DOCUMENTS

| | | | |
|---|---|---|---|
| 4,475,609 A | 10/1984 | Sakai et al. .................. 177/211 |
| 5,067,572 A | 11/1991 | Kyrtsos et al. .............. 177/139 |
| 5,070,953 A | 12/1991 | Kyrtsos et al. ........... 177/25.14 |
| 5,082,071 A | 1/1992 | Kyrtsos et al. ........... 177/25.14 |
| 5,105,895 A | 4/1992 | Kyrtsos .................... 177/25.14 |
| 5,105,896 A | 4/1992 | Kyrtsos .................... 177/25.14 |
| 5,139,101 A | 8/1992 | Smith ........................ 177/139 |
| 5,178,226 A | * 1/1993 | Bowman et al. ............ 177/139 |
| 5,182,712 A | 1/1993 | Kyrtsos et al. ............... 701/50 |
| 5,195,418 A | 3/1993 | Smith ............................ 91/31 |
| 5,287,885 A | 2/1994 | Smith .................... 137/596.17 |
| 5,329,441 A | 7/1994 | Aoki et al. .................... 701/50 |
| 5,472,056 A | 12/1995 | Orbach .......................... 172/2 |
| 5,509,293 A | 4/1996 | Karumanchi ................. 73/1.13 |
| 5,606,516 A | 2/1997 | Douglas et al. ............. 702/104 |
| 5,666,295 A | 9/1997 | Bruns ......................... 702/174 |
| 5,824,965 A | 10/1998 | Fujii et al. ................... 177/136 |
| 5,880,408 A | 3/1999 | Schreiner .................... 177/136 |
| 5,955,706 A | 9/1999 | Fonkalsrud et al. ........ 177/136 |
| 5,968,104 A | 10/1999 | Egawa et al. ................. 701/50 |
| 6,016,875 A | 1/2000 | Orbach et al. .................. 172/2 |

FOREIGN PATENT DOCUMENTS

| | | |
|---|---|---|
| GB | 1575291 | 9/1980 |
| GB | 2103811 A | 2/1983 |

* cited by examiner

Primary Examiner—Randy W. Gibson
(74) Attorney, Agent, or Firm—W Bryan McPherson, III; Kelsey L. Milman (57) ABSTRACT

The present invention provides a method and apparatus configured to perform viscosity compensation for a payload measurement system of a machine. The machine has at least one cylinder for elevating a payload carrier. The cylinder is connected to a fluid circuit having an actuating fluid. A plurality of pressure values of the actuating fluid are sensed during a lifting of a first payload. Then a plurality of pressure values of the actuating fluid are sensed during a lifting of a second payload. In addition a parameter indicative of the fluid viscosity associated with the first and second lift is established. A plurality of pressure values of the actuating fluid are sensed during a lifting of a third payload, and a parameter indicative of the viscosity of the actuating fluid associated with the third lift is established. A payload weight of the third payload is then determined in response to the viscosity indicative parameters, and the sensed plurality of actuating fluid pressure values.

17 Claims, 5 Drawing Sheets

Fig_6_

OIL TEMPERATURE DIFFERENCE BETWEEN CALIBRATION TIME AND WEIGHING TIME

Fig_7_

METHOD AND APPARATUS CONFIGURED TO PERFORM VISCOSITY COMPENSATION FOR A PAYLOAD MEASUREMENT SYSTEM

TECHNICAL FIELD

This invention relates generally to machines for transferring bulk material and, more particularly, to an apparatus and method for determining the weight of the bulk material being transferred.

BACKGROUND

Machines such as loaders are used generally to transfer bulk material from a stock pile onto transport machines such as truck or railroad cars. In such machine loading applications it is desirable that the transport machines are loaded to, but not over, their maximum rated capacity. Underloading causes inefficiency in the material hauling cycle and under utilization of the transport machines. Overloading causes additional maintenance cost and extra wear on the truck tires and suspension systems. Furthermore, the overloaded material may need to be unloaded to decrease load weight, causing additional expense. Therefore, accurate payload measurement is desirable.

Payload measurement is also desirable as a method of determining operation productivity. The ability to accumulate the weight of the material loaded during a single shift, during a twenty-four hour period, or during any other time period is valuable to an operations manager.

Payload measurement systems utilizing sensed lift cylinder pressures have been developed that enable the system to be calibrated using known weights and then used to determine payload weight during the operation of the machine. This measurement method is dependent on the pressure to weight ratio remaining consistent between the time the machine is calibrated and the time the machine is measuring an unknown load. This consistency is compromised when the working fluid viscosity deviates from the fluid viscosity at calibration time. Some weight measurement systems, such as that disclosed in U.S. Pat. No. 5,606,516 issued to Douglas et al. On Feb. 25, 1997, have been developed which attempt to account for changes in ambient temperature, or changes to the temperature of a pressure transducer. The system disclosed in Douglas applies to a weighing platform, or scale, adapted to determine the weight of a machine, such as a truck. Douglas discloses incorporating a temperature sensor to determine the temperature of the pressure transducers and hydraulic transducers used. A pressure transducer may change its sensing characteristics based on changes in its core temperature. Changes in temperature of the transducers may occur due to changes in ambient temperature and possibly changes in the fluid temperature passing through the transducer. However changes in the temperature of the transducer, even if due in part to fluid temperature changes, is an ineffective method of accounting for changes to the actuating fluid viscosity during the payload measurements. For example, there is not a direct correlation between fluid viscosity changes, and temperature changes of the pressure transducer itself. This is due in part to the fact that ambient temperatures effect the temperature of the pressure transducer. In addition, subtle changes in actuating fluid temperature may result in noticeable changes in the viscosity of the fluid, but may not result in any temperature variations of the pressure transducer itself.

Changes in fluid viscosity have a noticeable effect on payload calculations. The viscosity of the fluid changes as the temperature changes, as the actuating fluid degrades due to use or time, or if a fluid having a different viscosity is added to the hydraulic circuit. Changes in fluid viscosity effect the pressure of the fluid as the fluid travels through the valves, cylinders, pump and tank of the hydraulic circuit. Therefore, while pressure sensors may deliver accurate readings of the pressure when the temperature changes, the pressure does not correlate with the same payload weight measured at a different temperature, i.e., a different viscosity.

The present invention is directed to overcoming one or more of the problems set forth above.

SUMMARY OF THE INVENTION

In one aspect of the present invention, a method for dynamically measuring a payload weight for a machine is disclosed. The machine has at least one cylinder for elevating a payload carrier. The cylinder is connected to a fluid circuit having an actuating fluid. The method includes the steps of sensing a first plurality of pressure values of the actuating fluid during a lifting of a first payload; sensing a second plurality of pressure values of the actuating fluid during a lifting of a second payload; sensing a third plurality of pressure values of the actuating fluid during a lifting of a third payload; establishing a parameter indicative of the viscosity of the actuating fluid associated with the third lift; and establishing a payload weight of the third payload in response to the viscosity indicative parameter, and the first and second and third plurality of actuating fluid pressure values.

In another aspect of the present invention, an apparatus configured to dynamically measure a payload weight for a machine is disclosed. The machine has at least one cylinder for elevating a payload carrier. The cylinder is connected to a fluid circuit having an actuating fluid. The apparatus includes a pressure sensor configured to sense a pressure of the actuating fluid associated with the cylinder and responsively generating a pressure signal; an extension sensor configured to sense a characteristic indicative of an extension of the cylinder and responsively generating an extension signal; and a controller configured to receive a plurality of the extension, and pressure signals, at least one viscosity indicative parameter signal, associated with a first lift of a first payload having a first payload weight, a second lift of a second payload having a second payload weight, and a third lift of a third payload having a third payload weight, and determine a weight of said third payload in response to the plurality of pressure signals, the plurality of extension signals, the viscosity indicative parameter, and, the first payload weight and the second payload weight.

BRIEF DESCRIPTION OF THE INVENTION

DETAILED DESCRIPTION

Figure 1:
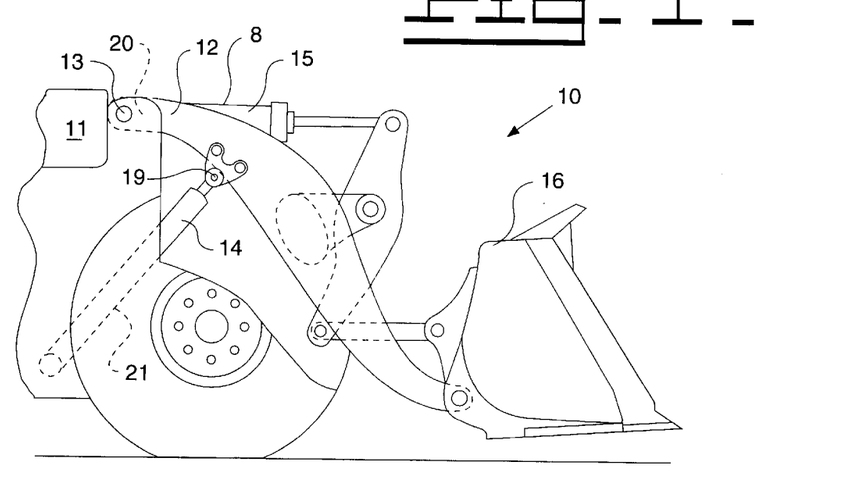
FIG. 1 is a side view of the forward portion of a loader machine.

In FIG. 1 a payload monitoring system is generally represented by the element number 10. Although FIG. 1 shows a forward portion of a wheel type loader machine 11 having a payload carrier in the form of a bucket 16, the present invention is equally applicable to machines such as track type loaders, and other machines having similar loading implements. The bucket 16 is connected to a lift arm assembly 12, which is pivotally actuated by two hydraulic lift cylinders 14 (only one of which is shown) about a pair of lift arm pivot pins 13 (only one of which is shown) attached to the vehicle frame. A pair of lift arm load bearing pivot pins 19 (only one of which is shown) are attached to the lift arm assembly 12 and the lift cylinders 14. The bucket 16 can also be tilted by a bucket tilt cylinder 15.

The payload monitoring system 10 includes an extension sensor 20 configured to sense a characteristic indicative of the extension of the cylinder 14. In one embodiment, the extension sensor is a rotary sensor 20 configured to sense the rotation of one of the lift arm pivot pins 13 from which the geometry of the lift arm assembly 12 or the extension of the lift cylinders 14 can be derived. The same rotary sensor 20 can be alternatively installed on the load bearing pivot pins 19 to provide the same information. In an alternative embodiment, the extension sensor 20 is a position sensor configured to sense the extension, or position, of a cylinder 14.

Figure 2:
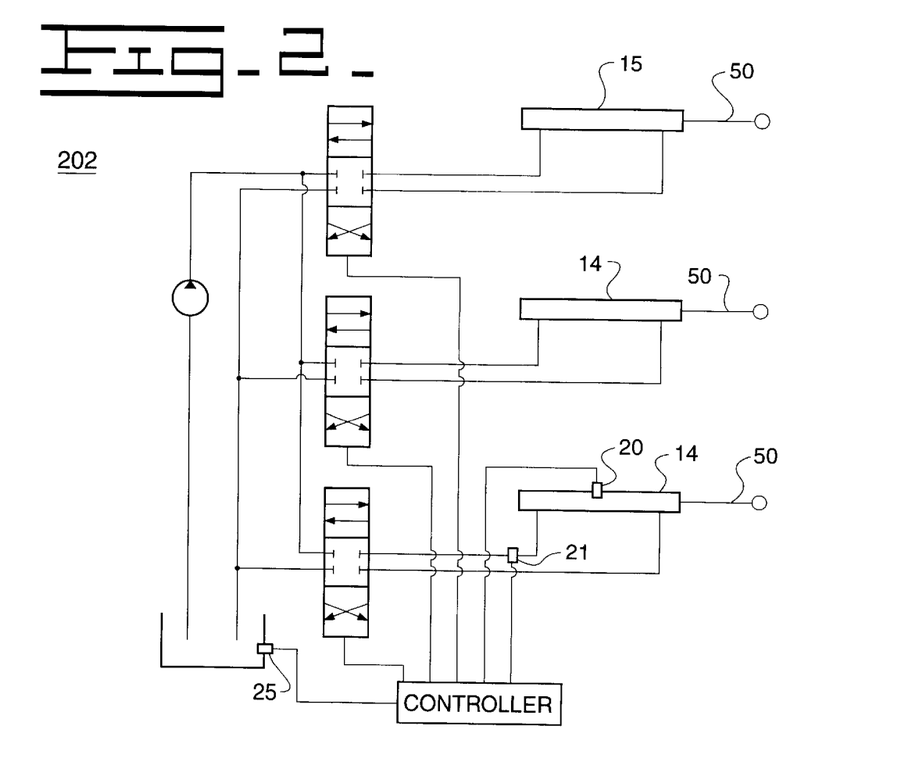
FIG. 2 is an example of a hydraulic circuit associated with the present invention.

A pressure transducer 21 senses the hydraulic pressure in one of the lift cylinders 14. Although there are two cylinders 14, the pressure in the cylinders is generally the same for a given payload and given lift arm assembly geometry. Thus, sensing fluid pressure associated with one of the cylinders 14 is sufficient for the present application. In addition, the cylinder 14 is connected to and receives actuating fluid from an actuating fluid circuit 202, illustrated in FIG. 2. FIG. 2 illustrates one example of a hydraulic circuit 202 connected to two lift cylinders 14 and a tilt cylinder 15. FIG. 2 illustrates the extension sensor 20 as a pressure sensor 20 that is associated with the cylinder to determine the position of the piston 50. The pressure transducer 21 may be located in other locations of the actuation fluid circuit 202 as long as the pressure transducer 21 is located in a manner that enables the sensing of a pressure indicative of the fluid pressure within the cylinder 14.

Figure 3:
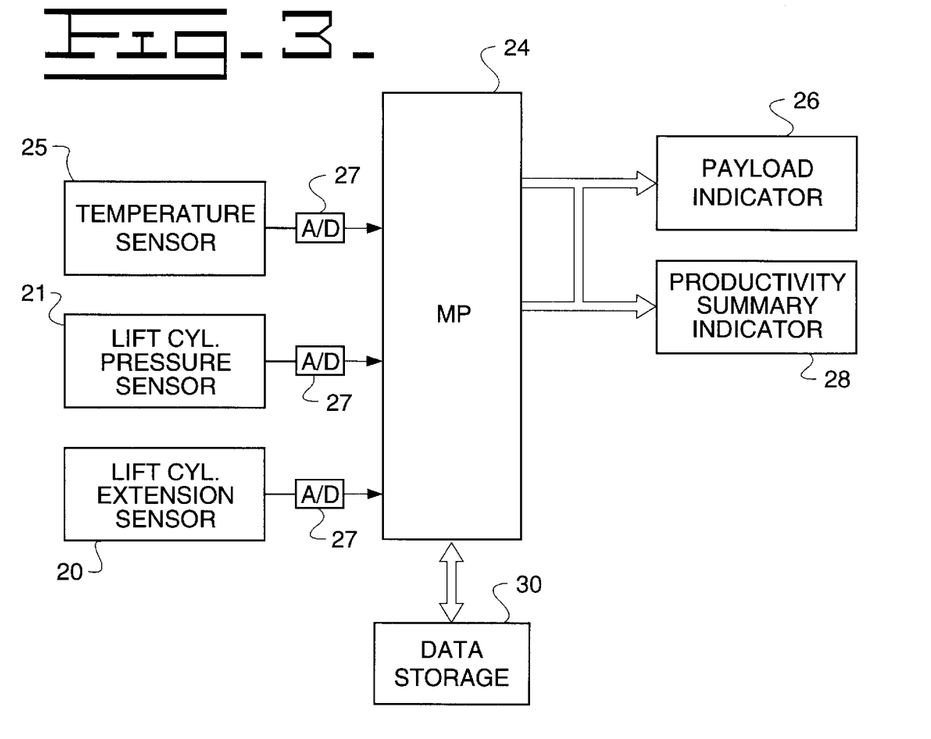
FIG. 3 is a block diagram of an embodiment of the present invention.

In addition, a temperature sensor 25, illustrated in FIG. 2, and 3, may be used to sense the temperature of the actuating fluid used in the hydraulic circuit 202 connected to the lift cylinder 14. In the preferred embodiment, the temperature sensor 25 is located in a manner that enables the sensor to sense the temperature of the actuating fluid in the tank or fluid reservoir associated with the hydraulic circuit 202. The temperature sensor 25 generates a signal indicative of the temperature of the actuating fluid. In the preferred embodiment, the actuating fluid is a hydraulic fluid, such as hydraulic oil.

Referring to FIG. 3, the cylinder pressure, extension sensor signals, and temperature signals are delivered to a microprocessor, or controller 24. In the preferred embodiment, the signals are processed by respective analog to digital (A/D) converters 27 before being delivered to the controller 24. In addition, the signals may be stored in internal memory within the controller 24, or a separate storage device 30.

Figure 4:
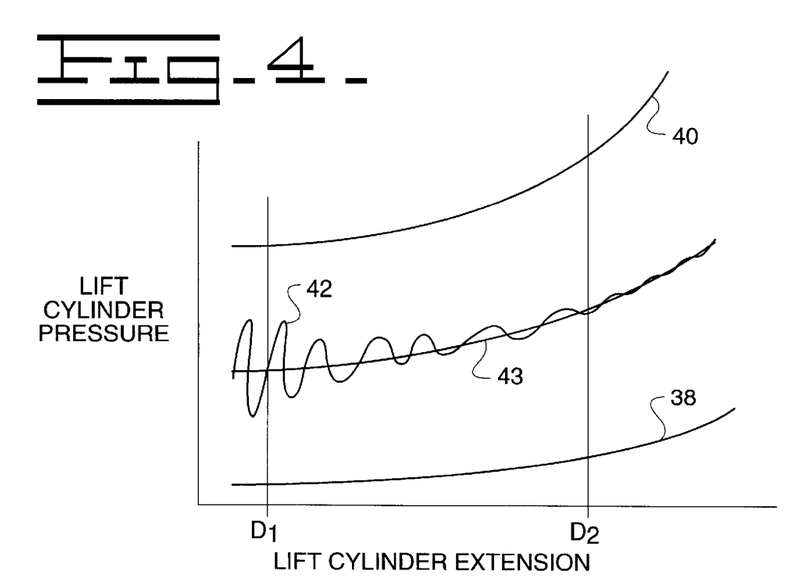
FIG. 4 is a graphical representation of cylinder pressure versus cylinder extension.

FIG. 4 graphically illustrates the relationship between cylinder pressure and cylinder extension in one embodiment of the present invention. The pressure and extension data are plotted on a graph having the lift cylinder pressure on the vertical Y-axis and the lift cylinder extension on the horizontal X-axis. A first curve 38 represents the curve fitted pressure versus extension data for a first weight of an empty loader bucket 16. A second curve 40 represents the curve fitted pressure versus extension data for a payload of known weight. These curves 38, 40, may be determined during a calibration procedure. The known weight is preferably at or near the rated load capacity of the machine 11. However, other payload weights, instead of, or in conjunction with the preferred empty load and near maximum rated load, may be used during the calibration process. The actual pressure signals received by the pressure transducer 21 have been curve fitted and averaged to remove random pressure surges to establish the first and second curves 38, 40 illustrated in FIG. 3. The curves 38, 40 may be sampled and stored as reference weight curves for the payload monitor system during the calibration process, as will be discussed below. As shown in FIG. 4, the lift cylinder pressure increases as the cylinder extension increases, during the lifting of the payload carrier 16.

A third lift curve 43, illustrates a lift curve associated with an unknown weight. Curve 43, which is shown superimposed over trace 42, has been curve fitted and averaged to remove the random pressure surges. Curve 42 is a trace of actual pressure measurements in one example of a lift. The curve 43 is a representation of the pressure versus extension of the weight being measured. Experimentation has shown the lift cylinder pressure varies linearly with the weight of a payload at a particular cylinder extension. Therefore, the payload weight can be calculated by interpolation if the curve 43 falls between the reference curves 38, 40, and by extrapolation if the curve 43 is outside of the reference curves 38, 40.

In addition, experimentation has shown that fluid pressure within the hydraulic circuit 202 decreases as viscosity decreases. In addition, viscosity decreases as fluid temperature increases. Therefore, fluid pressure decreases as the temperature of the actuating fluid increases given an equivalent payload and equivalent operating conditions of the hydraulic circuit 202, as illustrated in FIG. 4. The change in pressure due to changes in the fluid temperature, leads to a erroneous weight calculation unless the viscosity change, is compensated for.

Figure 5A:
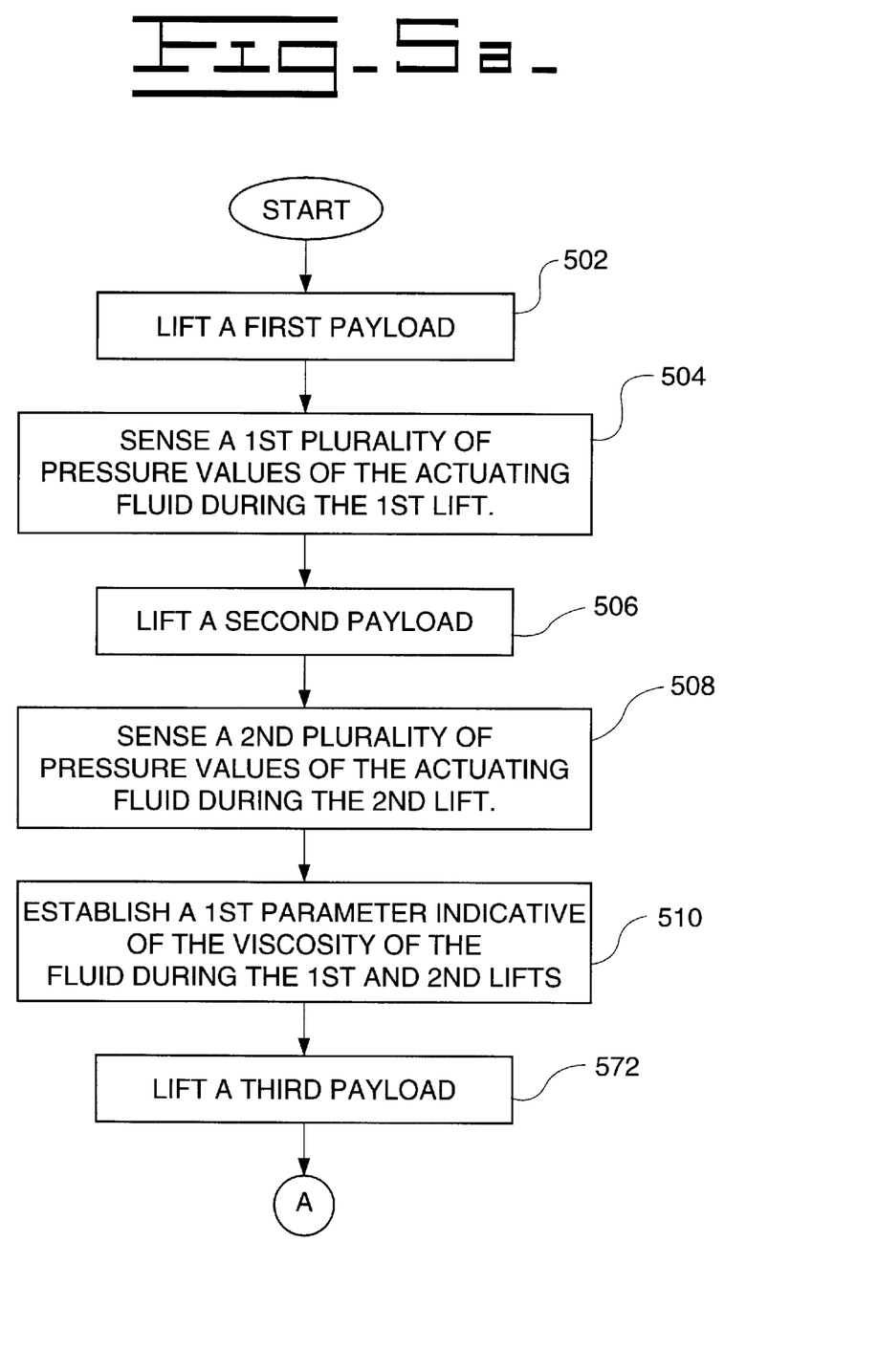
FIGS. 5A, 5B illustrate one embodiment of a method of the present invention.
Figure 5B:
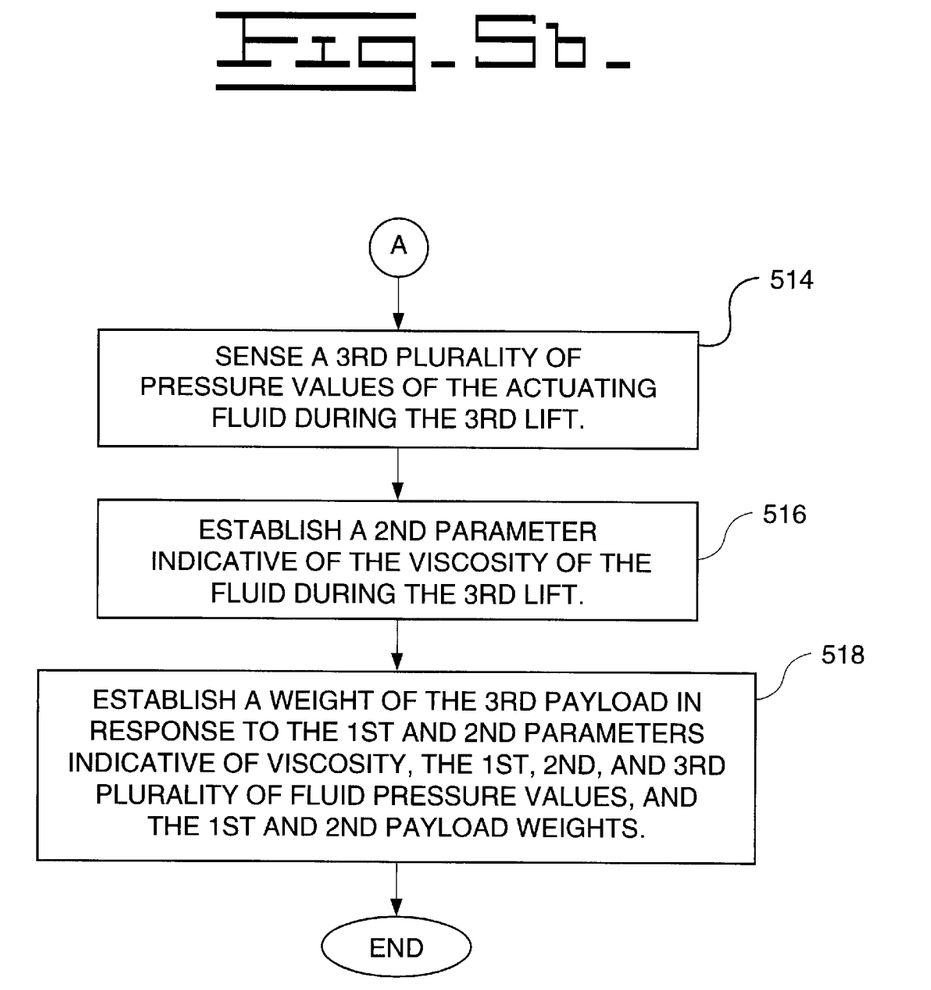

FIGS. 5A and 5B illustrate one embodiment of the method of the present invention. The method is configured to compensate for changes in viscosity associated with the actuating fluid of the hydraulic circuit connected to the lift cylinders, during the dynamic measurement of a payload weight. The present invention includes a calibration procedure for the payload measurement system. The calibration procedure includes lifting two payloads, of different weights, and determining the variations in pressure measurements that occur during the lifting. A parameter indicative of viscosity of the actuating fluid is established during the calibration procedure. For example, in one embodiment, the temperature is determined in order to perform viscosity compensation for the payload being weighed. That is, in one embodiment, temperature measurements are used to account for changes in viscosity of the actuating fluid from the time the calibration procedure is performed to the time the payload of unknown weight is being lifted.

In one embodiment, initiation of the calibration procedure may begin by the operator selecting a payload calibration option from a screen display (not shown), connected to the controller 24. The controller 24 may then initiate the calibration routine and monitor the lifting of the payload. Once the calibration routine is initiated, then, in a first control block 502, a first payload of a known weight is lifted. In the preferred embodiment, the payload carrier 16 is empty during one of the calibration lifts. Therefore calibration measurements may be taken using an empty payload carrier 16. In a second control block 504, a plurality of pressure values of the actuating fluid are sensed during the lifting of the first payload. In the preferred embodiment, a plurality of cylinder extension values are also sensed during the lifting of the first payload. In addition, the fluid pressure measurements and the extension measurements are preferably correlated with each other and stored in memory. In one embodiment, the payload is lifted from the ground level to a maximum lift position. However other variations in the range of the lift may be performed to acquire the pressure measurements.

In one embodiment, the payload measurement system continuously monitors cylinder extension. Based on analysis of the cylinder extension data, a determination may be made regarding whether the payload carrier 16 is being lifted. For example, if the cylinder extension exceeds a lifting extension threshold, the system may conclude a payload is being lifted and the fluid pressure may be sensed and stored, along with the associated cylinder extension measurements. If the cylinder extension exceeds a second lifting threshold extension, the lift may be determined to be completed, for the purposes of payload calculations. Alternatively, if the extension stops at one position more then a specified amount of time, then the lift may be considered over. Alternatively, the lift may be considered over when there is a rapid drop in fluid pressure. That is, when a payload carrier 14 dumps material, the fluid pressure in the cylinders 14 quickly drops.

In a third control block 506, a second payload of a known weight is lifted. In the preferred embodiment, the second payload is close to a maximum payload weight. In a fourth control block 508, a plurality of pressure values of the actuating fluid are sensed during the lifting of the second payload. In the preferred embodiment, a plurality of cylinder extension values are also sensed during the lifting of the second payload. In one embodiment, the sensed pressure values, and extension values if taken, are stored in memory. In addition, the fluid pressure measurements and the extension measurements are preferably correlated with each other and stored in memory.

In one embodiment, the hydraulic circuit conditions are the same for each of the lifts. For example, the velocity for each of the lifts is preferably the same.

In a fifth control block 510, a first parameter indicative of viscosity of the fluid during the first and second lifts is established. In the preferred embodiment, the actuating fluid temperature is sensed, as the parameter indicative of viscosity. Therefore, the temperature of the actuating fluid associated with the first and second lifts is established. The first and second lifts are preferably taken relatively close together from a time perspective, such that there is a minimal change in actuating fluid temperature. Therefore, the temperature of the actuating fluid may be sensed during the second lift and stored and utilized as the temperature associated with the first and second lifts. In one embodiment, the temperatures are compared with each other. If a difference between the temperatures of the first and second lifts exceeds a temperature threshold, e.g. 2 degrees, then the calibration process may be aborted and started over. If the temperature difference is less than the temperature threshold, then either one of the temperature values may be used to represent the temperature during the lifts, or the temperatures may be averaged together. In an alternative embodiment, the temperatures may be simply averaged together. In any case, a temperature associated with the first and second lifts is established and stored in memory. In one embodiment, the measurements for calibration have been acquired and the payload system is now ready for operation.

In a sixth control block 512, during the operation of the machine, a third payload of unknown weight is lifted. In a seventh control block 514, a plurality of pressure values are sensed during the lifting of the unknown weight. In an eighth control block 516, a parameter indicative of the viscosity of the actuating fluid is established. In the preferred embodiment, the parameter established is the temperature of the actuating fluid. Therefore, the temperature is sensed during the lifting of the unknown weight. As discussed above, the determination of when a lift is beginning or ending may be made based on monitoring the extension and change thereof of the cylinders, and/or monitoring the fluid pressure and change thereof. Therefore, in one embodiment, the payload measurement system is not continuously attempting to determine a payload weight, even when the machine is not performing a lifting operation.

In an ninth control block 518, a payload weight of the third payload is established in response to the first and second viscosity indicative parameters (e.g., the first and second temperatures), the first, second, and third plurality of fluid pressure values, and the first and second payload weights. In the preferred embodiment, the payload weight of the third payload is not established until the lifting of the third payload is completed. Alternatively, the payload may be determined as the data is being collected, or as soon as all of the desired data is collected. In addition, in the preferred embodiment. In addition, the extension sensor data is preferably used to determine the payload weight of the third payload.

In the preferred embodiment, the establishment of the third payload weight includes determining an uncompensated weight value for the payload. The uncompensated payload weight is then modified to compensate for viscosity changes between the calibration and operation of the payload system. Accordingly, a first differential pressure between the fluid pressures sensed during the lifting of the unknown weight, and the fluid pressures sensed during the lifting of an empty bucket (i.e., the first lift) is determined. A second differential pressure between the fluid pressures sensed during the lifting of the known weight, and the fluid pressures sensed during the lifting of the empty payload weight is determined. The first differential pressure is divided by the second differential pressure and the result is multiplied by the known payload weight. The following equation is used in the preferred embodiment to determine the uncompensated, unknown payload weight.

Where:

Payload is the unknown weight

Cal_Wt is the known weight at calibraton time, i.e., the second weight minus the first weight Pd is the difference between the sensed fluid pressure at a given cylinder extension during the lifting an unknown weight and the associated pressure sensed during the lifting of an empty bucket Cd is the difference between the sensed fluid pressure for a given cylinder extension during lifting of a known weight and the associated sensed pressure for a given cylinder extension during the lifting of an empty bucket n is the number of pressure measurements used in the determination. In one embodiment, all the valid pressure measurements received are used. Alternatively a subset of one or more measurements may be used.

Once an uncompensated weight for the third payload is determined, the weight may be modified to compensate for viscosity changes. As mentioned, in the preferred embodiment the viscosity changes may be compensated for by incorporating fluid temperature measurements. In the preferred embodiment, the equation for modifying the payload weight as a function of temperature is as follows:

Where:

0Temp is the difference between the temperature of the actuating fluid sensed during the lifting of the unknown weight, and the fluid temperature at the time of calibration m is a value determined empirically and is implementation dependent. For example, the value may change from one type of machine, or configuration, to another.

Figure 6:
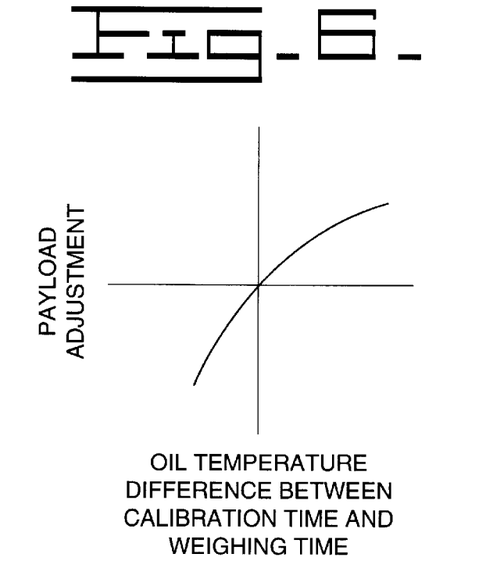
FIG. 6 is a graphical representation of payload adjustment versus fluid temperature difference.

FIG. 6 is a graph illustrating one embodiment of a representative payload adjustment desired based on the differential temperature. The value m is empirically determined to approximate the temperature (or viscosity) compensation curve of FIG. 6.

In an alternative embodiment, the establishment of the third payload weight includes determining an average of the pressure values sensed during the first lift. This average pressure may be determined after completion of the first lift and stored in memory at that time. In addition, an average of the pressure values sensed during the second lift may be averaged. This average may also be determined and stored after the second lift. The average pressure values are compared with each other to determine a differential average pressure. The pressure values associated with the third lift are also averaged together. The average pressure values of the first, or empty lift, and the third lift are compared with each other to determine a second differential average pressure. In addition, a temperature differential may be determined between the first temperature associated with the temperature of the actuating fluid during the first and second lifts, and the sensed temperature associated with the actuating fluid during the third lift. The payload weight may then be determined as a function of the differential average pressure of the first and second lifts, the differential average pressure of the first and third lifts, and the temperature differential. The relationship may be characterized by the following equation Where:

Cal_Wt is the known weight at calibraton time, i.e., the second weight minus the first weight dP2=the differential average pressure associated with the first and second lifts dP3=the differential average pressure associated with the first and third lifts m is a value determined empirically and is implementation dependent. The constant m is empirically determined to approximate the temperature (or viscosity) compensation curve of FIG. 6.

A typical loading cycle of a loader 11 includes, sequentially: digging and/or crowding a stock pile, racking back the bucket 16 to maintain the load, reversing and backing out of the pile while raising the bucket 16, traveling to a dump site or a transport vehicle while continuously raising the bucket 16, and finally dumping the load from the raised position. The machine is typically digging at the beginning of a lift cycle and dumping at the end of the lift cycle. Therefore, the cylinder pressure may vary drastically at each end of the lift cycle leading to sensing data that is not indicative of the actual payload that is lifted. In addition, cylinder extension may vary during operation depending on where the material is being dumped. For example, different loading trucks may have different heights that must be obtained before the material may be loaded into the truck. In addition, a dump pile may lead to a different lift extension than a truck in order for the material to be dumped, depending on the size of the dump pile. Therefore, in the preferred embodiment, a desired lift range is established in which the sensed pressure values may be considered indicative of the payload being lifted, i.e., the sensed pressure values may be considered to be valid data. For example, in one embodiment, the desired lift range is between 50% (a desired minimum lift threshold) and 80% (a desired maximum lift threshold) of the maximum extension of the lift cylinders. Therefore, in the preferred embodiment, the sensed pressure values of any of the first, second, or third lifts, are only used if the associated sensed cylinder extension value is within the desired lift range.

Alternatively, a desired lift range may be established based upon an analysis of the sensed pressures. For example, the sensed pressure values may be analyzed to determine when the pressure differential between two or several pressure readings is less than an acceptable differential. For example, if sequential pressure values indicate wide variations in pressure during a small change in cylinder extension, the pressure readings may be omitted from the payload measurement calibration, or determination process. Other data filtering and analysis techniques may be used to determine when the data is valid and representative of a lift. In this manner, the system is able to automatically account for data instability, and when a lift has begun and has ended. Alternatively, a desired pressure range may be established such that the sensed pressure must be within the pressure range to be accounted for during the processing.

In the preferred embodiment, the calibration process is performed when the actuating fluid temperature is above a calibration temperature threshold. Experimentation has indicated that when the actuating fluid is below a temperature threshold, e.g., 50 degrees Celsius, the pressure readings may vary dramatically during the calibration process leading to inaccurate payload measurements. In one embodiment the system is said to reach a steady state when the actuating fluid temperature is at or above the calibration temperature threshold. Therefore, in the preferred embodiment, if the fluid temperature is below a calibration temperature threshold the system will not perform calibration. If previous calibration values are available, the previous values may continue to be used for payload measurements. Alternatively, the operator of the machine may let the engine warm up, e.g., run the engine at high idle, or lift the bucket 16 one or more times, until the actuating fluid temperature increases such that calibration may be performed.

In one embodiment, the calibration procedure may be performed when the actuating fluid temperature is below the desired fluid calibration temperature. In one embodiment, when the temperature is below the desired temperature threshold, the equation for modifying the payload weight as a function of temperature is as follows:

Where:

dTemp is the difference between the temperature of the actuating fluid sensed during the lifting of the unknown weight, and the fluid temperature at the time of calibration m and B are values determined empirically and are implementation dependent. For example, the value may change from one type of machine, or configuration, to another.

Figure 7:
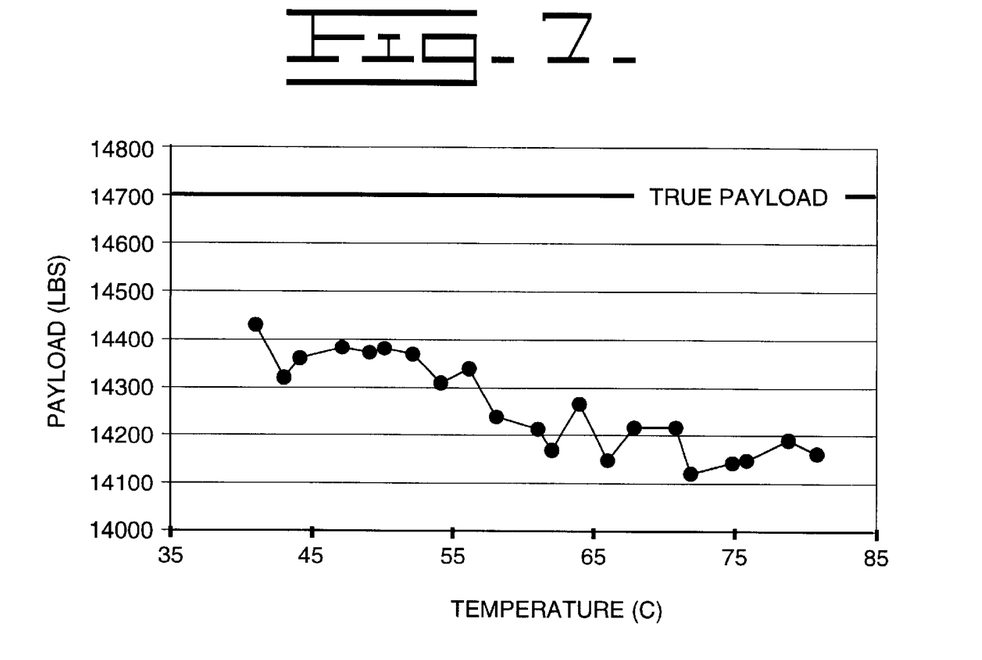
FIG. 7 is a graphical representation of payload weight shifting.

The value B represents a payload offset adjustment. The payload offset is a form of payload deviation, or payload shifting compensation. That is, for example, when an engine is started the system is in a transient state. The payload system may be experiencing fluctuations due to several issues, such as the actuating fluid viscosity is beginning to change as the fluid begins to warm up. FIG. 7 illustrates payload fluctuations that occur for a given payload, as the system state varies, when the calibration was performed below a desired temperature threshold. One example of a system state variation is the actuating fluid viscosity fluctuations that occur as the fluid temperature changes. The result is that, in this example, any payload measurements would need to be offset, or shifted to account for having calibrated the system at a temperature below the desired temperature threshold. Therefore, in one embodiment of the present invention, the value B, illustrated in the above equation, is utilized to account for payload shifting that occurs when the temperature is below the calibration threshold. The shifting variable B, may be a variable dependent upon the fluid temperature at which the calibration occurred. Therefore, different values of B may be stored and used based on the calibration temperature.

In the preferred embodiment, the calibration procedure is performed when the payload system has reached a steady state. As mentioned, in the preferred embodiment the steady state is achieved, or at least the system stabilizes to a desired state, e.g., inconsistent pressure readings are fewer, when the fluid temperature reaches approximately 50 degrees. However, other parameters may be sensed to determine when the system has reached a steady state system, such as the engine coolant temperature or transmission oil temperature.

Other viscosity compensation techniques may be used as alternatives to, or in conjunction with the above payload measurement calibration and monitoring technique. For example, in one embodiment, the viscosity of the actuating fluid may be determined during the calibration process. The operator may configure the machine and associated hydraulic circuit in a defined position, e.g., running at low idle, the payload carrier resting on the ground, and consistent load on the hydraulic circuit. The payload carrier 16 may be commanded to move by the operator, and the carrier 16 response time may be measured to determine what delay if any exists. Response times may be determined with the use of the extension sensors, i.e., by monitoring the delay between a commanded action, and actual movement of the carrier 16. The response times may be compared to standard response times for different fluid grades. A current viscosity of the actuating fluid may be determined, or estimated based on the comparison of the response times. Temperature readings may also be incorporated into the determination of the viscosity. Viscosity dependent variables may then be used during payload measurements to provide improved measurements. For example, multiple viscosity compensation curves, such as that illustrated in FIG. 6, may be empirically developed to represent the payload adjustment desired based on the differential temperature for different viscosities. In addition, the actual temperatures may be accounted for in the compensation curves to represent changes in payload measurements for an established fluid viscosity, temperature differential, and absolute fluid temperature readings. In this manner additional accuracy may be provided to the payload measurements.

Industrial Applicability

The operation of the present invention is best described in relation to its use in loading applications where knowledge of payload weight is important. This payload measurement system is also valuable in operations where it is desirable to monitor loader vehicle productivity.

Prior to using the payload monitor 10, the system should be calibrated. Calibration should also be repeated whenever there has been a change in the lift arm assembly configuration, such as switching to a different bucket 16, or substantial overhaul of any of the lift arm assembly subsystem. In the preferred embodiment, calibration of the payload monitor 10 includes lifting the lift arm assembly 12 from ground level to dump level with an empty bucket 16, establishing the payload weight, and repeating the procedure with material of a known weight in the bucket 16. Preferably, the known weight is near or at the rated capacity of the loader vehicle 11. In addition, preferably the bucket 16 should be racked back during the lifting process to ensure that the center of gravity (C.G.) of the payload weight remains near the center of the bucket 16. The racked back bucket 16 constraint may be removed by including a position sensor in the tilt cylinder 15 to sense the degree of bucket tilt to compensate for the C.G. shift.

A typical loading cycle of a loader 11 includes, sequentially: digging and/or crowding a stock pile, racking back the bucket 16 to maintain the load, reversing and backing out of the pile while raising the bucket 16, traveling to a dump site or a transport vehicle while continuously raising the bucket 16, and finally dumping the load from the raised position. This loading cycle is not interrupted by the usage of the dynamic payload monitor 10, because stopping the machine 11 is not required and the bucket 16 is not required to be positioned to a specific height for a period of time.

The present invention is also expandable to other machines with different linkage configurations by compensating for the difference thereof. Anticipated applicable machine types include excavators, front shovels, backhoe loaders, and any machines having at least one linkage with at least one hydraulic cylinder for modifying that linkage configuration. For these vehicle linkage configurations, additional pressure and extension sensors may be needed to detect cylinder pressure and linkage geometry during the work cycle. However, the basic payload weight calculations remains the same.

Other aspects, objects, and advantages of the present invention can be obtained from a study of the drawings, the disclosure, and the claims.

What is claimed is:

1. A method for dynamically measuring a payload weight for a machine having at least one cylinder for elevating a payload carrier, the cylinder being connected to a fluid circuit having an actuating fluid, comprising the steps of:

lifting a first payload having a first payload weight;

sensing a first plurality of pressure values of the actuating fluid during said lifting of said first payload;

lifting a second payload having a second payload weight;

sensing a second plurality of pressure values of the actuating fluid during said lifting of said second payload;

establishing a first temperature of the actuating fluid associated with said first lift and said second lift;

lifting a third payload having a third payload weight;

sensing a third plurality of pressure values of the actuating fluid during said lifting of said third payload;

establishing a second temperature of the actuating fluid associated with said third lift; and establishing a payload weight of said third payload in response to said first actuating fluid temperature, said second actuating fluid temperature, and said first and second and third plurality of actuating fluid pressure values, and said first and second payload weights.

2. A method, as set forth in claim 1, further wherein the step of establishing a payload weight further includes the steps of:

determining a first differential average pressure between said first and said second plurality of pressure values;

determining a second differential average pressure between said first and said third plurality of pressure values;

determining a fluid temperature differential between said first fluid temperature and said second fluid temperature; and establishing said third payload weight in response to said first actuating fluid temperature, said second actuating fluid temperature, said first and second differential average pressures, and said first and second payload weight.

3. A method, as set forth in claim 2, wherein the step of determining a third average pressure of said third plurality of pressure values further includes the steps of:

establishing a desired lift range within said third lift; and determining a third average pressure of said third plurality of pressure values sensed during the desired lift range.

4. A method, as set forth in claim 3, wherein the step of establishing a desired lift range further includes the steps of:

establishing a desired minimum lift threshold; and establishing a desired maximum lift threshold.

5. A method, as set forth in claim 4, wherein the step of establishing a desired lift range includes the step of determining a plurality of cylinder extensions during said third lift.

6. A method, as set forth in claim 2, wherein the step of determining a third average pressure of said third plurality of pressure values further includes the steps of:

establishing a desired pressure range within said third lift; and determining a third average pressure of said third plurality of pressure values sensed within the desired pressure range.

7. A method, as set forth in claim 1, wherein the step of sensing a first plurality of pressure values includes the steps of:

establishing a temperature threshold; and sensing a temperature of the actuating fluid;

sensing said first plurality of pressure values in response to said sensed temperature exceeding said temperature threshold.

8. A method, as set forth in claim 1, wherein the step of establishing said first temperature includes the step of:

sensing a first lift temperature of said actuating fluid during said first lift;

sensing a second lift temperature of said actuating fluid during said second lift;

averaging said first lift temperature and said second lift temperature; and establishing said first temperature in response to said average.

9. A method, as set forth in claim 1, wherein the step of establishing said first temperature includes the step of sensing a first lift temperature of said actuating fluid during said first lift;

sensing a second lift temperature of said actuating fluid during said second lift; and establishing said first temperature in response to said first lift temperature being within a temperature threshold of said second lift temperature.

10. An apparatus configured to dynamically measuring a payload weight for a machine having at least one cylinder for elevating a payload carrier, the cylinder being connected to a fluid circuit having an actuating fluid, comprising:

a pressure sensor configured to sense a pressure of the actuating fluid associated with the cylinder and responsively generating a pressure signal;

an extension sensor configured to sense a characteristic indicative of an extension of the cylinder and responsively generating an extension signal;

a temperature sensor configured to sense a temperature of the actuating fluid and responsively generating a temperature signal; and a controller configured to receive a plurality of said extension signal, and a plurality of said pressure signals, during a first lift of a first payload having a first payload weight, a second lift of a second payload having a second payload weight, and a third lift of a third payload having a third payload weight, receive at least one temperature signal during said first lift and said second lift, and receive a temperature signal during said third lift, and determine a weight of said third payload in response to said plurality of pressure signals, said plurality of extension signals, said at least one calibration temperature signal, said third lift temperature signal, said first payload weight and said second payload weight.

11. A controller, as set forth in claim 10, further configured to determine a temperature differential in response to said at least one calibration temperature and said third lift temperature, determine said third payload weight in response to said plurality of pressure signals, said plurality of extension signals, said temperature differential, said first payload weight and said second payload weight.

12. An apparatus, as set forth in claim 11, wherein said controller is further adapted to determine a first pressure differential in response to said plurality of pressure signals associated with said first lift and second lift, and a second pressure differential in response to said plurality of pressure signals associated with said first lift and said second lift, determine a weight differential between said first and said second payload weight, determine an uncompensated third weight in response to said first and second pressure differentials, and said weight differential, and determine said third payload weight in response to said uncompensated weight, and said temperature differential.

13. A method for dynamically measuring a payload weight for a vehicle having at least one cylinder for elevating a payload carrier, the cylinder being connected to a fluid circuit having an actuating fluid, comprising the steps of:

lifting a first payload having a first payload weight;

lifting a second payload having a second payload weight;

establishing a first viscosity of the actuating fluid during at least one of said first and second lift;

lifting a third payload having a third payload weight;

sensing a first actuating fluid temperature of during said third lift;

determining a change in said viscosity in response to said first fluid temperature;

and determining said third payload weight in response to said first payload weight, said second payload weight, and said viscosity change.

14. A method, as set forth in claim 13, further including the steps of:
- sensing a first plurality of pressure values of the actuating fluid during said lifting of said first payload;
- sensing a second plurality of pressure values of the actuating fluid during said lifting of said second payload; and
- sensing a third plurality of pressure values of the actuating fluid during said lifting of said third payload.

15. A method, as set forth in claim 14, wherein the step of determining a weight of said third payload further includes the step of determining said third payload weight in response to said third payload in response to said viscosity change, and said first and second and third plurality of actuating fluid pressure values, and said first and second payload weights.

16. A method, as set forth in claim 15, further including the step of:
- establishing a second fluid temperature of the actuating fluid associated with said first lift and said second lift;
- and wherein the step of determining said viscosity change includes the step of determining said viscosity change in response to said first and second temperature.

17. A method for dynamically measuring a payload weight for a machine having at least one cylinder for elevating a payload carrier, the cylinder being connected to a fluid circuit having an actuating fluid, comprising the steps of:
- lifting a first payload having a first payload weight;
- sensing a first plurality of pressure values of the actuating fluid during said lifting of said first payload;
- lifting a second payload having a second payload weight;
- sensing a second plurality of pressure values of the actuating fluid during said lifting of said second payload;
- establishing a parameter indicative of a viscosity of the actuating fluid associated with said first lift and said second lift;
- lifting a third payload having a third payload weight;
- sensing a third plurality of pressure values of the actuating fluid during said lifting of said third payload;
- establishing a second parameter indicative of the viscosity of the actuating fluid associated with said third lift; and
- establishing a payload weight of said third payload in response to said first viscosity parameter, said second viscosity parameter, and said first and second and third plurality of actuating fluid pressure values, and said first and second payload weights.

* * * * *

UNITED STATES PATENT AND TRADEMARK OFFICE
CERTIFICATE OF CORRECTION

PATENT NO. : 6,552,279 B1
DATED : April 22, 2003
INVENTOR(S) : Kevin J. Lueschow et al.

It is certified that error appears in the above-identified patent and that said Letters Patent is hereby corrected as shown below:

Title page,
Item [22], replace the filing date with the following:
-- Filed:     Sept. 28, 2000 --

Column 6,
Insert the following after Line 53:

$$Payload = Cal\_Wt * \frac{\sum_{i=1}^{n} \frac{Pd_i}{Cd_i}}{n}$$

Column 7,
Insert the following after Line 9:
-- $Pld\_updt = Payload + (m* dTemp)$ --
Insert the following after Line 45:
-- $Pld\_updt = (Cal\_Wt* dP2 / dP3) + (m* dTemp)$ --

Column 8,
Insert the following after Line 59:
-- $Pld\_updt = Payload + (m* dTemp + B)$ --

Signed and Sealed this

Thirtieth Day of September, 2003

JAMES E. ROGAN
*Director of the United States Patent and Trademark Office*